Jan. 25, 1944.　　　A. BOYNTON　　　2,339,760
NON PIPE-MASHING WRENCH
Original Filed Jan. 31, 1939
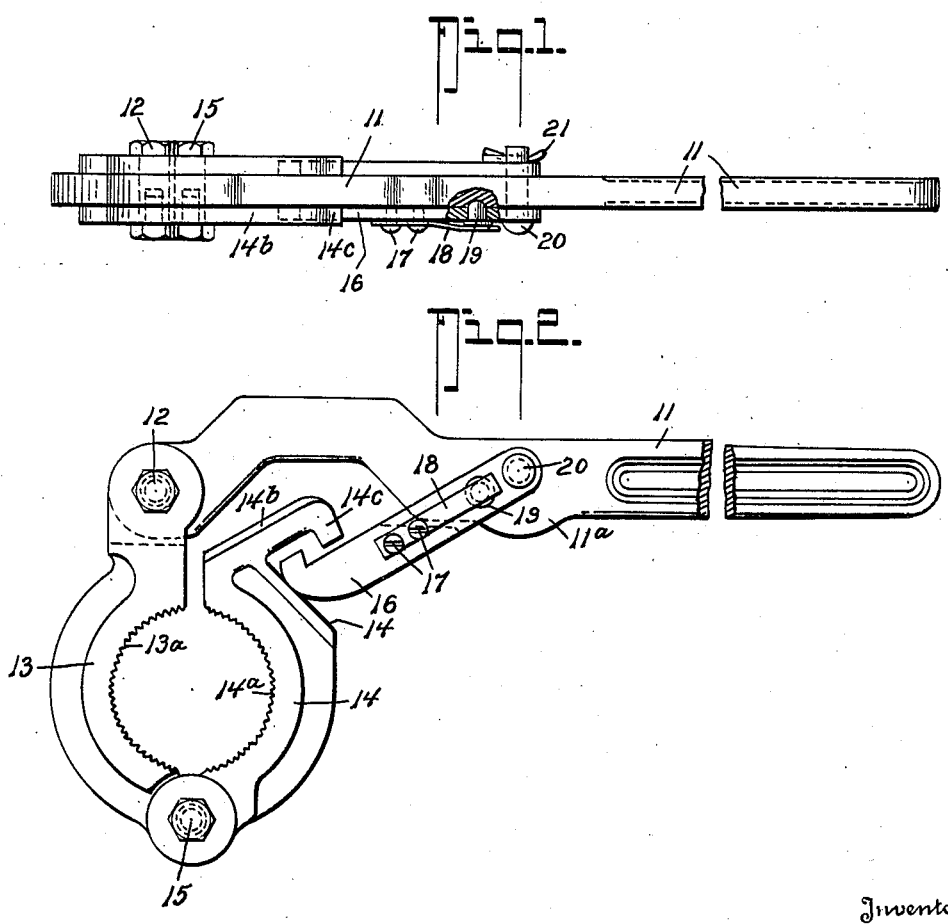
Inventor
Alexander Boynton
By Albert E. Dieterich
Attorney Patented Jan. 25, 1944

2,339,760

UNITED STATES PATENT OFFICE 2,339,760

NON-PIPE-MASHING WRENCH

Alexander Boynton, San Antonio, Tex.

Original application January 31, 1939, Serial No. 253,882. Divided and this application October 23, 1941, Serial No. 416,266

1 Claim. (Cl. 81—91)

My invention relates to wrenches and particularly to pipe wrenches or tongs.

The objects are to provide a wrench that, (1) will not mash the pipe, (2) will not score or cut the pipe by embedding teeth as deeply as other wrenches do, (3) will not slip on the pipe, and (4) may be more quickly applied or removed than any other means for making up or breaking out pipe without damaging the pipe.

I accomplish the foregoing purposes by means of two pipe grippers hinged together, one being hinged upon a handle and the other being adapted to be urged toward the first one by means upon the handle, as will more fully appear from the accompanying drawing, in which—

Fig. 1 is an edge view of an assembly of this invention further shown in Fig. 2.

Fig. 2 is a top plan view of the assembly shown in Fig. 1.

Similar characters refer to similar parts throughout the two views of each embodiment.

In Figs. 1 and 2, the handle 11 is hinged upon the pipe gripper 13 by the bolt 12. The pipe gripper 14 is hinged in turn upon the pipe gripper 13 by the bolt 15. The dog 16 is hinged upon the handle 11 by the pin 20 secured by the cotter key 21. The flat spring 18 is secured upon the dog 16 by the pair of screws 17 so that the latch pin 19 is urged resiliently by said spring to engage within a shallow depression upon the handle 11 (see Fig. 1) when the assembly is in the position shown in Fig. 2.

To engage the wrench upon the pipe (not shown) the dog 16 is pulled backward away from the pipe gripper 14. The latch pin 19 will be disengaged thereby from its socket in the handle 11 (see Fig. 1). The pipe grippers 13 and 14 may be opened then to allow them to be placed about the pipe. The dog 16 then is moved backward to the position shown in Fig. 2, with the latch pin engaged upon the smooth surface of the handle 11. If the pipe grippers 13 and 14 then are urged upon the pipe with one hand, while the handle is pulled clockwise toward the pipe with the other hand, the dog 16 will slide upon the straight surface 14d; thereby causing the pipe grippers to engage their teeth 13a and 14a upon the pipe.

The wrench may be now "pumped" to release the pipe grippers each time the handle is pushed anti-clockwise away from the pipe, and to engage them again as in the first instance each time it is pulled clockwise toward the pipe. In this pumping operation the dog 16 is held from releasing the finger 14c at the extremity of the arm 14b by the latch pin 19. The arcuate expansion 11a of the handle 11 provides that the latch pin 19 will ride upon the handle in all positions of the dog 16.

In this invention, a different sized pair of pipe grippers, of course, will be required for each different diameter of pipe.

It is apparent that minor changes and substitutions can be made within the scope of the stated objects and appended claim and I reserve the right to make such changes and substitutions.

This application is a division of my application filed January 31, 1939, Ser. No. 253,882.

I claim:

In a pipe wrench: a handle having an offset portion adjacent one end; a pipe gripper pivoted at one of its ends to said one end of the handle; a second pipe gripper pivoted at one of its ends to the other end of the first pipe gripper, said second pipe gripper having a straight edge portion adjacent its free end and an arm extending at an angle to said straight edge portion and forming a finger which is movably positioned in said offset portion of the handle when the wrench is in use; a dog pivoted to said handle adjacent said offset portion of the handle and having a free end for engaging said straight edge portion and having a finger for engaging the finger of said arm when said dog end is moved away from said straight edge portion by movement of said handle; and a spring loaded latch device for releasably securing said dog in its operative position during operation of the wrench.

ALEXANDER BOYNTON.